Nov. 2, 1937.  E. L. HOEFLER  2,098,095
FISH LURE
Filed June 19, 1935
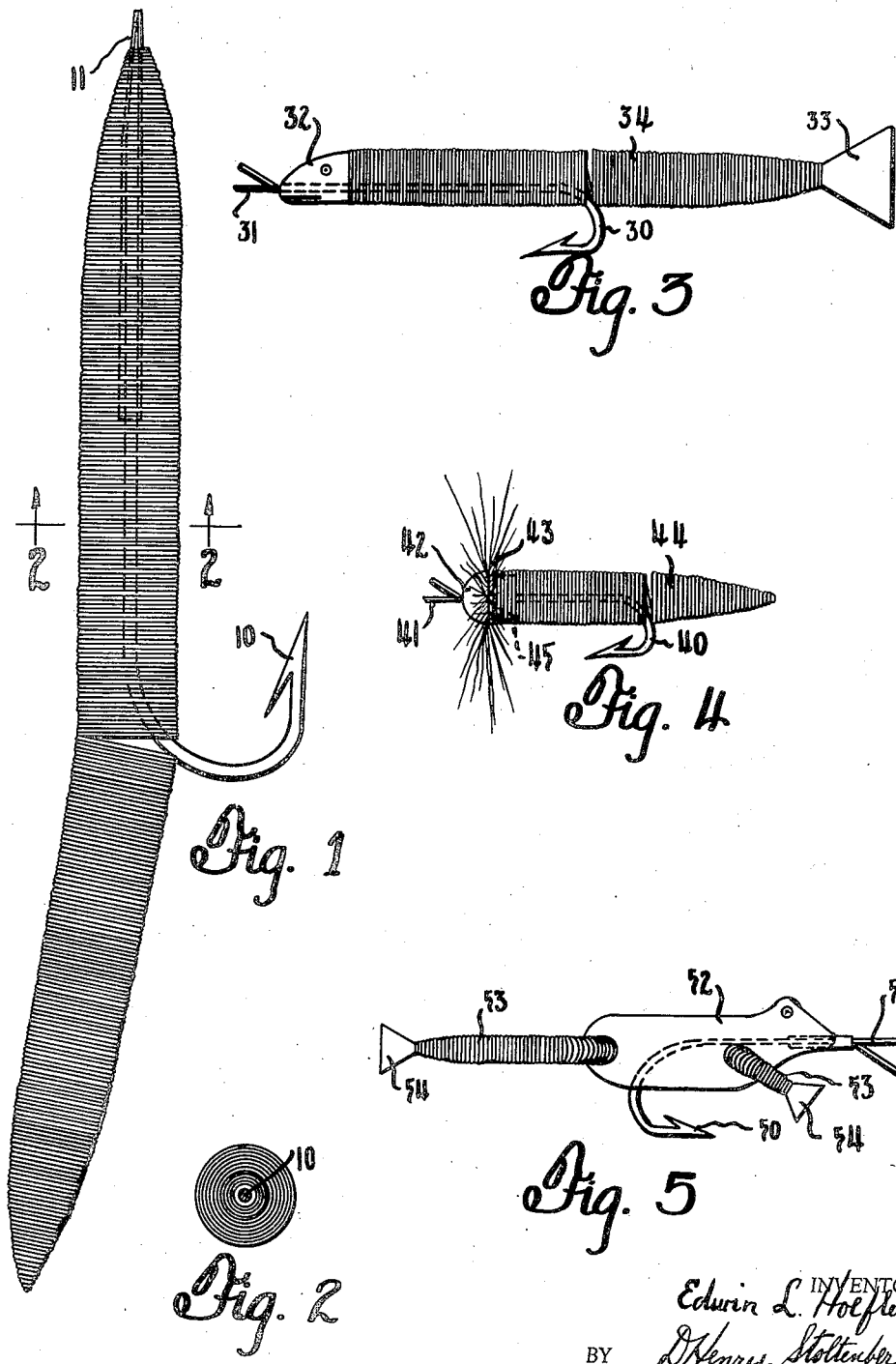

Patented Nov. 2, 1937

2,098,095

UNITED STATES PATENT OFFICE 2,098,095

FISH LURE

Edwin L. Hoefler, Detroit, Mich.

Application June 19, 1935, Serial No. 27,358

6 Claims. (Cl. 43—42)

This invention relates to fish lures, particularly to fish lures in which the form and action of a natural bait is simulated by an artificial construction.

Artificial fish lures to be effective under fishing conditions must closely imitate the action of the natural bait while it is in the water, and at the same time be durable enough to withstand continuous use. The lure should also be simple to construct and cheap to manufacture, so that the marketing problem is simplified.

It is therefore an object of this invention to provide a mechanical means which will closely simulate the action of natural baits artificially, such as worms, minnows, flies, frogs and the like, while they are in the water.

It is a further object of this invention to provide a fish lure that artificially imitates the form, color, and contour of natural baits.

It is a further object of this invention to provide an artificial means to give form, color, and contour to a fish lure which is extremely lifelike, and which is very flexible and collapsible to give the fish hook great effectiveness.

It is a further object of this invention to provide an artificial fish lure that is highly durable and may be used repeatedly as a bait without destroying its effectiveness through loss of form, color, or contour.

It is a further object of this invention to provide a fish lure that is simple and very cheap to manufacture.

It is a further object of this invention to provide a fish lure that can be colored any desirable hue and yet remain highly flexible, and that the lure may be repeatedly collapsed without destroying the coloring effect.

It is a further object of this invention to provide a construction for a fish lure that can be made either flexible or semi-flexible by the application of the coloring matter to the coil forming the body of the lure.

Other objects of this invention will appear in the following description and appended claims, reference being had to the accompanying drawing forming a part of this specification wherein like reference characters designate corresponding parts in the several views.

Fig. 1 is an elevational view of the lure in which the body of a worm is simulated.

Fig. 2 is a cross section taken substantially along the line 2—2 of Fig. 1.

Fig. 3 is an elevational view of the lure in which a minnow is simulated.

Fig. 4 is an elevational view of the lure in which a fly is simulated.

Fig. 5 is an elevational view in which my invention is applied to simulate the extremities of an artificial frog.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the preferred embodiment of my invention, I use an elongated means, such as a piece of spring wire or the like of a suitable material such as phosphor-bronze, to form the body of the bait which I desire to imitate.

Referring to Fig. 1, there is shown a bait in which my invention is employed to imitate the body of a common worm. In this bait, I employ a usual fish hook 10 with its snelled leader 11 attached thereto in a well known manner. To this hook I may attach my artificial bait either permanently or temporarily as the need requires.

To form my artificial bait, I take a piece of spring wire having the proper characteristics of flexibility and strength, which are controlled by the size of the bait, and coil the same about a form of the proper contour and taper. After the coiling operation is completed, the form is removed from the coil, leaving the coil in its permanent form with the loops substantially adjacent each other.

The coil is then attached to the shaft of the hook 10, either temporarily or permanently as desired. The hook 10 is threaded through the coil and the point may be placed through the coil side as is clearly shown in Fig. 1. The action of the bait must be natural while it is in the water, and the hook is positioned so that it can act with the greatest efficiency and still not disturb the action of the bait. As the coil is extremely flexible and collapses easily under the slightest pressure, it is assured that the hook 10 can act efficiently under conditions when a fish is striking.

For convenience in forming a coil with unusual contours, as for example in the formation of a worm having tapered ends, I may divide my coil into two parts so that they may be removed easily from the form after the coiling operation is complete. Thereafter, I may attach the two parts separately to the hook 10 or I may join the two parts together in any convenient manner before they are applied to the hook, as by clipping, brazing, etc., and then applying them to the hook as a unit.

In this manner, I can form a coil to imitate artificially the bodies of most natural baits in the fabrication of my fish lure. For example in Fig. 1, there is shown an artificial worm fabricated through the use of my invention. In the same manner, I can imitate bugs, frogs, minnows, flies, and the like.

To give proper coloring effect to my bait or lure, I may select material whose natural color is such as to form an attractive lure, or I may take my basic spring material and cover it with a thin layer of other metal of the proper color, as for example copper, nickel, and the like. By using this thin layer of metal, applied by any well known method as by deposition, a color medium of great durability and efficiency is provided. The lure may also be colored by the use of a thin coating of coloring material other than metal, such as enamel, or the like. This coloring matter is preferably applied to the spring wire before the coiling process, so that the collapsibility and flexibility of the completed coil will not be impaired. However, the coloring matter may also be applied after the coiling process is complete, either by the metal plating or by the enamel. In this case the coloring matter will stiffen the coil and give it a rigidity, which may be desirable under some conditions.

In Fig. 3 there is shown an artificial minnow to which my invention has been applied. There is provided a hook 30, a leader 31, a head 32 of some rigid material as for example wood, and a tail 33. Positioned between the head 32 and the tail 33, there is a coil of spring wire 34 of any desirable cross-sectional dimension, to form the body of the minnow which has great flexibility and may be readily collapsed under pressure to give the hook 30, which is threaded therethrough, its greatest efficiency.

In a similar manner, there may be formed an artificial fly as shown in Fig. 4. It consists of a hook 40, a leader 41, a head 42 of some rigid material, a collar 43 of hair or the like attached to the head 42 to simulate wing structures, and a tapering body 44 formed of a coil similar to those already described. The body 44 is securely fastened to the head 42 in any convenient manner, as by fitting it to the boss 45, positioned directly behind the head.

In Fig. 5, I have shown a manner in which my invention may be adapted to artificial frogs. There is provided a hook 50 with its leader 51, a body 52 of the frog of any suitable material such as rubber and the like, and extremities 53 formed of coils of wire similar to those described above. Fins 54 may be secured to the outer ends of the legs or extremities to give them greater action in movement through the water.

I claim:

1. In a fish lure, a hook, a leader attached to said hook, and a body positioned about said hook, comprising a coil of relatively fine wire with the adjacent loops closely juxtaposed and of such contour as to simulate a natural bait, said body being readily collapsible by lateral pressure.

2. In a fish lure with a body and a hook means, a continuous piece of relatively fine wire having elastic qualities, bent in a series of loops relatively adjacent each other to form the body of the lure, said loops being flexible and collapsible under slight lateral pressure for non-interference with the hook means during a strike.

3. In a fish lure with a body and a hook means, an elongated means of relatively small cross-sectional area formed of a series of loops relatively adjacent each other, to form a flexible collapsible coil positioned about the hook to simulate the body.

4. In a fish lure with a flexible body and a hook means, an elongated means of relatively small cross-sectional area coiled with relatively adjacent loops to form a flexible, collapsible body positioned about the hook, and which will substantially collapse when subjected to a lateral pressure.

5. In a fishing fly, a hook, a leader, an artificial wing structure, and a body formed about said hook by an elongated means of relatively small cross-sectional area coiled in a series of substantially adjacent loops, collapsible under a lateral pressure for non-interference with the hook during a strike.

6. In a fishing minnow with a hooking means, a head, a tail, and a body positioned about the hooking means therebetween formed from an elongated means of relatively small cross-sectional area coiled in a series of relatively adjacent loops of proper size and contour to simulate the natural contour of a minnow, said loops being extremely flexible and under lateral pressure, collapsible for non-interference with the hook during a strike.

EDWIN L. HOEFLER.